J. C. SPOONER.
HORSE-COLLAR.
No. 176,086. Patented April 11, 1876.
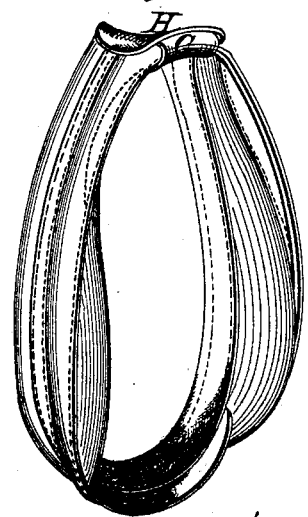
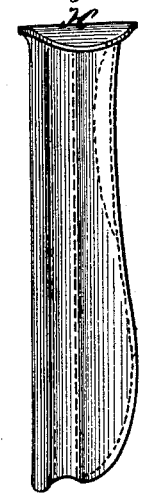
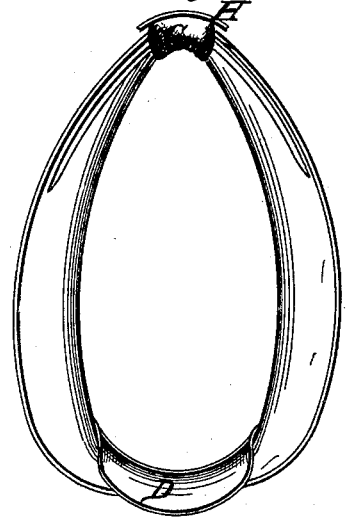
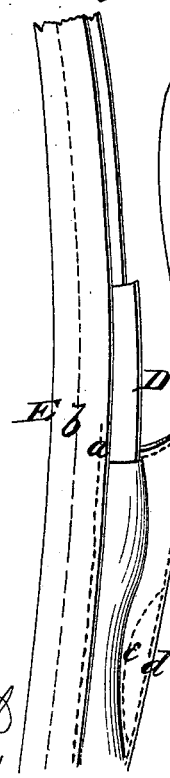
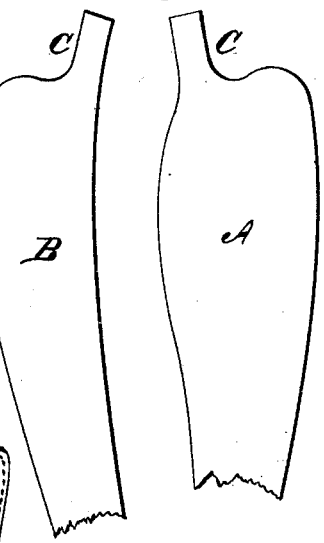

UNITED STATES PATENT OFFICE.

JONAS C. SPOONER, OF HOULTON, MAINE.

IMPROVEMENT IN HORSE-COLLARS.

Specification forming part of Letters Patent No. 176,086, dated April 11, 1876; application filed January 21, 1876.

*To all whom it may concern:*

Be it known that I, JONAS C. SPOONER, of Houlton, in the county of Aroostook, and in the State of Maine, have invented certain new and useful Improvements in Horse-Collars; and do hereby declare that the following is a full, clear, and exact description thereof, reference being had to the accompanying drawings, and to the letters of reference marked thereon, making a part of this specification.

My invention relates to horse-collars; and it consists in the method of cutting and uniting the pieces of leather of which the collar is formed, as will be hereinafter more fully set forth.

In order to enable others skilled in the art to which my invention appertains to make and use the same, I will now proceed to describe its construction and operation, referring to the annexed drawing, in which—

Figure 1 is a perspective view of a horse-collar embodying my invention. Fig. 2 is a side view, and Fig. 3 an inside or rear view, of the same. Fig. 4 shows a portion of the collar when sewed together before it is stuffed. Fig. 5 shows the patterns used.

A represents the inner, and B the outer, piece, forming the pad of the horse-collar, as shown in Fig. 5. Each of these patterns is cut with a point or projection, C, projecting from the swell at the bottom, about two inches long, and more or less tapering, as required. E represents the roll of the collar, into which is placed a piece, D, of harness-leather, which piece is to be about ten inches long and two inches wide, and put in and sewed with the first row of stitching, a. b represents an extra row of stitching about three-fourths of an inch from the edge. The roll is stitched with the upper edge of the center-piece D first, and then wet and laid straight on the bench and the upper part rubbed back. The side of the collar is then laid down with the widest part lapping over the center-piece D about three-fourths of an inch, and the points C extending about two inches farther, and is brought on a straight line with the roll and placed in position, and the upper part drawn over and tacked ready for sewing one side of the collar and center-piece as placed in the roll.

After the collar is stuffed it comes into place perfectly natural; there is no puckering or gathering or forcing into shape in any manner whatever. There is also a considerable saving in material.

The extra center-piece D, inserted in the roll and stitched with the first row of stitching a, strengthens the throat of the collar and saves expense in manufacturing.

The main object of my invention is to relieve the pressure upon the point of the horse's shoulder, and thereby prevent chafing and give the horse a chance to step without drawing his load by the point of the shoulders.

With the ordinary collar it requires more exertion for the horse to move his fore leg in a hard place under the pressure of a full-throated collar than it does to haul the load, for that is done by the nerve of the leg; but with my collar properly adjusted the movement of the leg is free and the horse has all his strength to haul his load. The collar does not bear on the lower part of the horse's breast, and hence does not sweat the breast, and the horse is not so liable to catch cold. The horse can put his foot farther forward, as there is nothing to hinder his movement, and it will not stiffen the shoulder by drawing, as with the usual collar.

The extra row of stitching, b, in the roll forms a natural channel to hold the hame, making a saving in blocking the collar. The belly of the collar projects inward to fit the neck, instead of rolling out the pattern. After it is stuffed it comes into form natural. At the top is a leather piece, G, crossing the under side, and the ends thereof fastened on top under the saddle H. This prevents the stitching from galling the horse's neck. At the top of the collar in each pad is a curved row of stitching, e, forming a depression, d, which favors the motion of the top of the shoulder-blade.

Having thus fully described my invention, what I claim as new, and desire to secure by Letters Patent, is—

1. In the roll E of a horse-collar, the two parallel rows of stitching a and b, made a suitable distance apart to form a natural channel, without blocking, for holding the hame, substantially as herein set forth.

2. The center-piece D, inserted and fastened in the roll E, in combination with the sides A B, having tongues or points C, substantially as and for the purposes herein set forth.

3. The curved row of stitching e, forming the depression d at the top on each side of the collar, as and for the purposes herein set forth.

In testimony that I claim the foregoing I have hereunto set my hand this 25th day of November, 1875.

JONAS C. SPOONER.

Witnesses:
  JOHN WATSON,
  WALDO G. BROWN.